(12) United States Patent
Yoon et al.

(10) Patent No.: US 9,755,724 B2
(45) Date of Patent: Sep. 5, 2017

(54) ELECTRONIC APPARATUS FOR DETERMINING RELAY APPARATUS AND METHOD THEREOF

(71) Applicant: Samsung Electronics Co., Ltd., Gyeonggi-do (KR)

(72) Inventors: In-Su Yoon, Gyeonggi-do (KR); Su-Ha Yoon, Seoul (KR); Won-Suk Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 14/257,838

(22) Filed: Apr. 21, 2014

(65) Prior Publication Data

US 2015/0156676 A1 Jun. 4, 2015

(30) Foreign Application Priority Data

Nov. 29, 2013 (KR) ........................ 10-2013-0147944

(51) Int. Cl.
| | | |
|---|---|---|
| *H04W 36/00* | (2009.01) | |
| *H04B 7/14* | (2006.01) | |
| *H04W 36/38* | (2009.01) | |
| *H04W 36/30* | (2009.01) | |
| *H04B 7/155* | (2006.01) | |
| *H04B 7/26* | (2006.01) | |

(52) U.S. Cl.
CPC ............... *H04B 7/14* (2013.01); *H04B 7/155* (2013.01); *H04B 7/2606* (2013.01); *H04W 36/30* (2013.01)

(58) Field of Classification Search
CPC .... H04W 36/0016; H04W 36/38; H04B 7/14; H04B 7/2606; H04B 7/155
See application file for complete search history.

(56) References Cited

U.S. PATENT DOCUMENTS 5,613,067 A * 3/1997 Brady ............... G06F 15/17375
709/225
6,009,326 A * 12/1999 Roder ................... H04W 92/02
455/436

(Continued)

FOREIGN PATENT DOCUMENTS

KR    10-2013-0016609    2/2013

*Primary Examiner* — Rasheed Gidado (57) ABSTRACT

The present disclosure relates to an electronic apparatus for determining a relay apparatus and a method thereof. An electronic apparatus according to various embodiments includes a communication unit that transmits and receives data. The electronic apparatus also includes a controller that determines whether disconnection between an electronic apparatus operating as a relay apparatus and at least one client apparatus is expected. The control also, if the disconnection is expected, informs the at least one client apparatus of the expected disconnection. The control also determines whether a status of the electronic apparatus satisfies a condition for a change to a new relay apparatus and informs the at least one client apparatus that the electronic apparatus no longer operates as the relay apparatus if the condition for a change to a new relay apparatus is satisfied. The control also determines any one of the at least one client apparatus as the new relay apparatus. The control also informs the at least one client apparatus of the determination on the new relay apparatus. Further, other embodiments are possible.

20 Claims, 5 Drawing Sheets

(56) References Cited

U.S. PATENT DOCUMENTS

| | | | | | |
|---|---|---|---|---|---|
| 6,161,014 | A * | 12/2000 | Girardeau | | H04W 36/30 370/331 |
| 7,113,742 | B2 * | 9/2006 | Kindo | | H04M 1/6091 455/11.1 |
| 8,446,853 | B2 * | 5/2013 | Umeda | | H04W 24/02 370/311 |
| 8,457,073 | B2 * | 6/2013 | Kwun | | H04B 7/15542 370/331 |
| 8,514,790 | B2 * | 8/2013 | Drewes | | H04B 7/15521 370/329 |
| 8,825,040 | B2 * | 9/2014 | Hooli | | H04W 72/02 455/11.1 |
| 8,885,651 | B2 * | 11/2014 | Purohit | | H04W 76/068 370/331 |
| 8,897,262 | B2 * | 11/2014 | Van Phan | | H04B 7/15592 370/310.2 |
| 9,155,002 | B2 * | 10/2015 | Jang | | H04W 76/043 |
| 2001/0046212 | A1 * | 11/2001 | Nakajima | | H04L 45/02 370/278 |
| 2004/0078426 | A1 * | 4/2004 | Nagami | | H04L 47/10 709/203 |
| 2005/0213520 | A1 * | 9/2005 | Bae | | H04W 76/062 370/277 |
| 2012/0158859 | A1 * | 6/2012 | Saxena | | H04L 51/30 709/206 |
| 2012/0263096 | A1 * | 10/2012 | Masini | | H04W 36/10 370/315 |
| 2012/0314586 | A1 * | 12/2012 | Yamamoto | | H04W 76/04 370/246 |
| 2012/0315841 | A1 * | 12/2012 | Zhou | | H04B 7/2606 455/11.1 |
| 2013/0040576 | A1 | 2/2013 | Yoon | | |
| 2013/0332686 | A1 * | 12/2013 | Ishizawa | | G06F 3/0647 711/162 |
| 2014/0308966 | A1 * | 10/2014 | Wang | | H04W 48/20 455/450 |

* cited by examiner

ELECTRONIC APPARATUS FOR DETERMINING RELAY APPARATUS AND METHOD THEREOF

CROSS-REFERENCE TO RELATED APPLICATION(S) AND CLAIM OF PRIORITY

The present application is related to and claims the priority under 35 U.S.C. §119(a) to Korean Application Serial No. 10-2013-0147944, which was filed in the Korean Intellectual Property Office on Nov. 29, 2013, the entire content of which is hereby incorporated by reference.

TECHNICAL FIELD

The present disclosure relates to an electronic apparatus for providing status information of a relay apparatus and determining a new relay apparatus based on the provided status information, and a method thereof.

BACKGROUND

In general, the relay apparatus transmits apparatus information such as Service Set Identification (SSID), a Media Access Control Address (MAC address), and an Internet Protocol Address (IP address) of the relay apparatus, a channel used by the relay apparatus, a password scheme used by the relay apparatus, and a signal intensity of the relay apparatus, to neighboring client apparatuses. The relay apparatus uses a beacon or probe response when transmitting the apparatus information. The beacon is periodically broadcasted to the neighboring client apparatuses, and the probe response can be transmitted as a response to a probe request transmitted by apparatus scanning.

The neighboring client apparatuses that receive the apparatus information from the relay apparatus display the received apparatus information on the screen such that the user can connect an AP apparatus and client apparatuses based on apparatus information of the AP apparatus.

As described above, according to the conventional art, the relay apparatus transmits its own apparatus information to the neighboring apparatuses and the neighboring apparatuses perform connections based on the receive apparatus information.

However, according to the conventional art, there is a problem in that if the relay apparatus moves such that a distance from the neighboring apparatuses is equal to or more than a threshold distance for which a communication can be performed or if a battery of the relay apparatus is dead, a connection between the relay apparatus and the neighboring apparatuses is disconnected.

In addition, according to the conventional art, it is inconvenient in that before the relay apparatus moves to the threshold distance or beyond, or before the battery of the relay apparatus dies, a status of the relay apparatus may not be known.

SUMMARY

To address the above-discussed deficiencies, it is a primary object to provide an electronic apparatus for determining a new relay apparatus for performing a relay function based on status information of the relay apparatus and a method thereof.

An aspect of the present disclosure to achieve the purposes described above is to provide an electronic apparatus including a communication unit that transmits and receives data. The electronic apparatus may also include a controller that determines whether disconnection between an electronic apparatus operating as a relay apparatus and at least one client apparatus is expected. The controller also informs the at least one client apparatus of the expected disconnection if the disconnection is expected. The controller also determines whether a status of the electronic apparatus satisfies a condition for a change to a new relay apparatus and informs the at least one client apparatus that the electronic apparatus no longer operates as the relay apparatus if the condition for the change to the new relay apparatus is satisfied. The controller also determines any one of the at least one client apparatus as the new relay apparatus. The controller also informs the at least one client apparatus of the determination of a new relay apparatus.

According to aspects of the present disclosure, a relay apparatus determining method includes determining whether disconnection between an electronic apparatus operating as a relay apparatus and at least one client apparatus is expected. The relay apparatus determining method also includes, if the disconnection is expected, informing the at least one client apparatus of the expected disconnection. The relay apparatus determining method also includes determining whether a status of the electronic apparatus satisfies a condition for a change to a new relay apparatus. The relay apparatus determining method also includes informing the at least one client apparatus that the electronic apparatus no longer operates as the relay apparatus if the condition for the change to the new relay apparatus is satisfied. The relay apparatus determining method also includes determining any one of the at least one client apparatuses as the new relay apparatus. The relay apparatus determining method also includes informing the at least one client apparatus of the determination of the new relay apparatus.

According to another aspect of the present disclosure, an electronic apparatus includes a communication unit that transmits and receives data. The electronic apparatus also includes a controller that determines whether disconnection between an electronic apparatus operating as a relay apparatus and at least one client apparatus is expected. The controller also informs the at least one client apparatus of the expected disconnection if the disconnection is expected. The controller also determines whether a status of the relay apparatus satisfies a condition for a change to a new relay apparatus. The controller also informs the at least one client apparatus that the electronic apparatus no longer operates as the relay apparatus such that the at least one client apparatus determines a new relay apparatus if the condition for the change to the new relay apparatus is satisfied.

According to another aspect of the present disclosure, a relay apparatus determining method includes determining whether disconnection between an electronic apparatus operating as a relay apparatus and at least one client apparatus is expected. The relay apparatus determining method also includes, if the disconnection is expected, informing the at least one client apparatus of the expected disconnection. The relay apparatus determining method also includes determining whether a status of the relay apparatus satisfies a condition for a change to a new relay apparatus. The relay apparatus determining method also includes informing the at least one client apparatus that the electronic apparatus no longer operates as the relay apparatus such that the at least one client apparatus determines the new relay apparatus if the condition for the change to the new relay apparatus is satisfied.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, specific example embodiments of the present disclosure will be described with reference to the accompanying drawings. The present disclosure is not limited or restricted by example embodiments, and it should be understood that the disclosure includes all modifications, equivalents, and substitutions included in the idea and the technical scope of the present disclosure. The same reference signals presented in the drawings refer to the same elements performing the substantially same functions.

It will be understood that, although the terms first, second, and the like may be used herein to describe various elements, these elements should not be limited by these terms. These terms are only used to distinguish one element from another. For example, a first element could be termed a second element, and, similarly, a second element could be termed a first element, without departing from the scope of the present disclosure. The terms used herein are presented in order to describe a specific embodiment, and does not intended to limit the present disclosure. As used herein, the singular forms "a", "an" and "the" are intended to include the plural forms as well, unless the context clearly indicates otherwise.

The electronic apparatus according to the present disclosure may be any apparatus provided with a display, and the electronic apparatus may be a portable device, a mobile terminal, a communication terminal, a portable communication terminal, a portable mobile terminal, and the like.

For example, the electronic apparatus may be a smart phone, a cellular phone, a game machine, a TV, a display apparatus, a car head unit, a note book computer, a laptop computer, a Tablet computer, a Personal Media Player (PMP), a Personal Digital Assistants (PDA), a wearable device, and the like. The electronic apparatus can be embodied by a pocket-sized portable communication terminal including a wireless communication function. Further, the electronic apparatus may be a flexible display apparatus. In addition, the present disclosure can be applied to an apparatus to which an image sensor can be mounted. Further, such electronic apparatuses may include an apparatus for a virtual space.

The representative configuration of such electronic apparatus is a cellular phone, and some components in the configuration of the electronic apparatus may be omitted or modified, if necessary. Further, such a configuration may be embodied by hardware or software, or a combination of hardware and software.

An embodiment of the present disclosure is described with an example of an electronic apparatus used as a relay apparatus. At this point, the relay apparatus may be an Access Point (AP), a Group Owner (GO) of Wi-Fi Direct, a mobile hotspot, a master device of Bluetooth, and the like.

Figure 1:
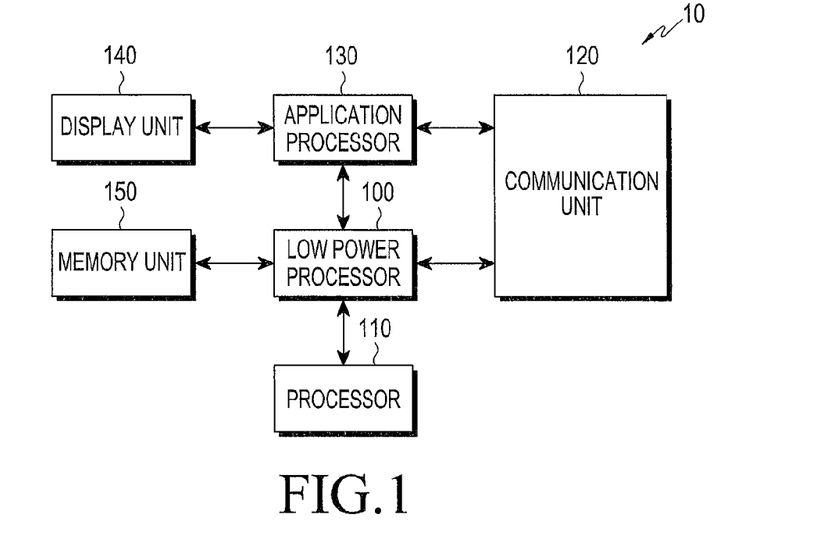
FIG. 1 illustrates a block diagram showing a configuration of an electronic apparatus according to an embodiment of the present disclosure.

FIG. 1 illustrates a block diagram showing a configuration of an electronic apparatus according to an embodiment of the present disclosure.

An electronic apparatus 10 according to an embodiment of the present disclosure includes a low power processor 100, a sensor 110, a communication unit 120, an application processor 130, a display unit 140, and a memory unit 150.

The low power processor 100 controls the entire operation of the electronic apparatus 10, and controls the communication unit 120 such that status information of the electronic apparatus 10 (hereinafter also referred to as "relay apparatus") operating as a relay apparatus is transmitted to a plurality of client apparatuses. Here, the status information of the relay apparatus includes an identifier, a movement distance, a movement displacement, a signal intensity, a type of communication network, the number of connections, a remaining amount of battery power, a battery level, expected services (a printer, a monitor, the Digital Living Network Alliance (DLNA), and the like), an upper application program, and the like of the relay apparatus. Herein, the movement distance refers to a distance for which the relay apparatus moves, and the movement displacement refers to a positional change of the relay apparatus when the relay apparatus moves. Further, the remaining amount of the battery refers to a remaining battery amount out of the entire battery amount of the relay apparatus, and the battery level refers to a battery power indicated in levels.

In an embodiment, the low power processor 100 collects status information of the relay apparatus through the communication unit 120, and can control the communication unit 120 such that, in response to a beacon frame and a probe request message, the collected status information of the relay apparatus is included in the probe response message and transmitted. At this point, the status information of the relay apparatus can be included in a vendor specific field in the beacon frame or a vendor specific field in the probe response message.

Hereinafter, the low power processor 100 determines whether the disconnection between the relay apparatus and at least one client apparatus is expected. If the disconnection between the relay apparatus and the at least one client apparatus is expected, the low power processor 100 notifies the client apparatuses of the expected disconnection between the relay apparatus and the at least one client apparatus.

In specific, in order to determine whether the disconnection between the relay apparatus and the at least one client apparatus is expected, the low power processor 100 can perform at least one of the operations of determining whether a movement distance of the relay apparatus sensed by the sensor 110 is equal to or more than a predetermined first threshold value and determining whether the movement displacement of the relay apparatus is equal to or more than a predetermined second threshold value or can determine whether the remaining amount of the battery of the relay apparatus is equal to or less than a predetermined third threshold value. Further, according to another embodiment, the low power processor 100 can perform at least one of the operations of determining whether the movement distance of the relay apparatus is equal to or more than the predetermined first threshold value, determining whether the movement displacement of the relay apparatus is equal to or more than the predetermined second threshold value, and determining whether the remaining amount of the battery of the relay apparatus is equal to or less than the predetermined third threshold value.

In this manner, the low power processor 100 can transmit the disconnection notification message including the status information of the relay apparatus to the client apparatuses in order to notify the client apparatuses of the expected disconnection between the relay apparatus and the client apparatuses.

The first to third threshold value according to the embodiment of the present disclosure are predetermined values for each determination operation and may be equal to or different from each other.

Hereinafter, the low power processor 100 determines whether the status of the relay apparatus satisfies the condition for a change to a new relay apparatus. If the status of the relay apparatus satisfies the condition for the change to the new relay apparatus, the low power processor 100 determines that the electronic apparatus 10 may not continue to perform a relay function and controls the communication unit 120 such that the client apparatuses are notified that the electronic apparatus 10 can operate as the relay apparatus no more. At this point, the low power processor 100 performs at least one of the operations of determining whether the battery level of the relay apparatus is equal to or less than a predetermined fourth threshold value and determining whether the intensities of signals received from client apparatuses are equal to or less than a predetermined fifth threshold value. If the battery level of the relay apparatus corresponds to any one of statuses in which the battery level of the relay apparatus is equal to or less than the predetermined fourth threshold value and the intensities of signals received from client apparatuses are equal to or less than the predetermined fifth threshold value, the low power processor 100 can determine that the status of the relay apparatus satisfies the condition for the change to a new relay apparatus.

According to another embodiment, the low power processor 100 continues to monitor the status of the relay apparatus, and determines whether the monitored status of the relay apparatus satisfies the condition for the change to a new relay apparatus. At this point, the low power processor 100 monitors at least one of the battery level of the relay apparatus and the intensities of signals received from the client apparatus, and performs at least one of the operations of determining whether the monitored battery level of the relay apparatus is equal to or less than the fourth threshold value and determining whether the monitored intensities of the signals received from the client apparatuses are equal to or less than the fifth threshold value.

If at least one of the statuses in which the battery level of the relay apparatus is equal to or less than the fourth threshold value and the intensities of the signals received from the client apparatuses are equal to or less than the fifth threshold value is satisfied, the low power processor 100 determines that the electronic apparatus 10 can no longer operate as the relay apparatus. According to the embodiment of the present disclosure, the fourth to fifth threshold values are predetermined values for each determination operation, and may be equal to or different from each other.

If at least one of statuses in which the battery level of the relay apparatus is more than the threshold value, and the intensities of the signals received from the client apparatuses is satisfied, the low power processor 100 determines that the electronic apparatus 10 can perform the function of the relay apparatus, and thus can monitor the battery level of the relay apparatus or the intensities of the signals received from the client apparatuses.

The low power processor 100 controls the communication unit 120 such that a relay apparatus change notification message for notifying that the electronic apparatus 10 can no longer operate as a relay apparatus is transmitted to the one or more client apparatuses. Such relay apparatus change notification messages may include information on client apparatuses currently connected to the relay apparatus together with the status information of the relay apparatus. Here, the status information may include network information such as SSID, a security method, a password of the relay apparatus together with the battery level of the current relay apparatus. Further, the information on the client apparatuses connected to the relay apparatus may be a list on one or more client apparatuses connected to the relay apparatus.

In this manner, when transmitting the status information of the relay apparatus and the information on the client apparatuses, the low power processor 100 can include the information to the vendor specific field of the beacon frame and transmit the information to the client apparatus.

If the notification message is received from the relay apparatus, the client apparatus can configure a user interface for notifying the status of the relay apparatus or notifying the expected disconnection from the relay apparatus based on the received status information of the relay apparatus and display the user interface on the screen.

For example, the client apparatus may display a pop-up window including texts such as "the connected AP apparatus is moving," "the AP apparatus is moving so the network will be disconnected soon," "the battery of the connected AP apparatus is low," or "the battery of the connected AP is low, so the network will be disconnected soon," on the screen. According to the present embodiment, the pop-up window indicating text is described, but any configurations for displaying pictures, drawings, or the like may be possible, and the notification may be output with a voice, a video, a vibration, or the like.

If a response message in response to the relay apparatus change notification message from the client apparatuses through the communication unit 120 is received, the low power processor 100 can determine a new relay apparatus based on the received response message.

Here, the client apparatus may include client status information indicating that the client apparatus can operate as the relay apparatus in the response message, and transmit the client status information to the relay apparatus. At this point, the client status information may include an identifier, a movement distance, a movement displacement, a signal intensity, a type of a communication network, a remaining amount of battery power, a battery level, expected services (a printer, a monitor, DLNA, and the like), and upper application information of the client apparatus together with the number of other client apparatuses that can be connected to the client apparatus, an intent value indicating a numeral value which indicates how much an operation to the relay apparatus is desired, a list of searched neighboring client apparatuses, client apparatuses that can perform communication with the client apparatus among the searched neighboring client apparatuses, and the like.

The low power processor 100 can determine a client apparatus that can be connected to the most client apparatuses as a new relay apparatus by considering the received client status information of the client apparatuses.

The low power processor 100 generates a new relay apparatus notification message for notifying the determination of the new relay apparatus, and controls the communication unit 120 such that the generated new relay apparatus notification message is broadcast to client apparatuses. If there are client apparatuses that are not connected to the new relay apparatus, the low power processor 100 includes an apparatus list of the corresponding client apparatuses in the new relay apparatus notification message, and notifies the determination of the new relay apparatus by broadcasting and sharing the notification message with the client apparatuses through the communication unit 120.

According to another embodiment of the present disclosure, the low power processor 100 determines whether the status of the relay apparatus satisfies the condition for a change to a new relay apparatus. If the status of the relay apparatus satisfies the condition for the change to a new relay apparatus, the low power processor 100 can transmit a signal for determining a new relay apparatus to the application processor 130.

If the signal is transmitted from the low power processor 100, the application processor 130 can control the communication unit 120 such that a relay apparatus change notification message for notifying that the electronic apparatus 10 can no longer operate as the relay apparatus is transmitted to the at least one client apparatus. If a response message to the relay apparatus change notification message is received through the communication unit 120, the application processor 130 can determine a new relay apparatus based on the received response message. Thereafter, the application processor 130 can generate a new relay apparatus notification message for notifying the determination of the new relay apparatus, and can generate the communication unit 120 such that the generated new relay apparatus notification message is broadcast to client apparatuses.

The sensor 110 can sense at least one of the movement distance and the movement displacement of the electronic apparatus 10 and transmit the sensing signal of the at least one of the movement distance and the movement displacement to the low power processor 100.

The communication unit 120 performs communication with the client apparatuses, and can use various communication schemes for the communication. At this point, the various communication schemes can include a cellular network such as 3G/4G, a wireless LAN, the Bluetooth, an infrared data association (IrDA), a WiFi-Direct communication, a Near Field Communication (NFC), and the like. The communication unit 120 can be configured independently from the low power processor 100 as illustrated in FIG. 1, or can be configured to be included in the low power processor 100 according to another embodiment.

If a signal for determining a new relay apparatus is transmitted from the low power processor 100, the application processor 130 can control the communication unit 120 such that the notification message for notifying that the electronic apparatus 10 can no longer operate as a relay apparatus is transmitted to one or more client apparatuses.

If a response message is received in response to the notification message of the relay apparatus from the client apparatuses through the communication unit 120, the application processor 130 can determine a new relay apparatus based on the received response message. Especially, the application processor 130 can consider the client status information of the client apparatuses included in the received response message, and determine the client apparatus that can be connected to the most client apparatuses as a new relay apparatus.

Thereafter, the application processor 130 can generate a new relay apparatus notification message for notifying the determination of the new relay apparatus, and can control the communication unit 120 such that the generated new relay apparatus notification message is broadcast to the client apparatuses.

The display unit 140 can be configured with a Liquid Crystal Display (LCD), and visually provides the user with a menu, input data, function setting information, and various other items consisting of other information related to the electronic apparatus 10. The display unit 140 can be configured with various apparatuses in addition to the LCD. The display unit 140 performs a function of outputting a booting screen, a standby screen, a display screen, a telephone conversation screen, and other application execution screens of the electronic apparatus 10, and the like.

The memory unit 150 can store a signal or data which is input or output in response to operations of the low power processor 100, the sensor 110, the communication unit 120, the application processor 130, and the display unit 140. Further, the memory unit 150 can store control programs and applications for controlling the electronic apparatus 10, the low power processor 100, or the application processor 130.

Figure 2:
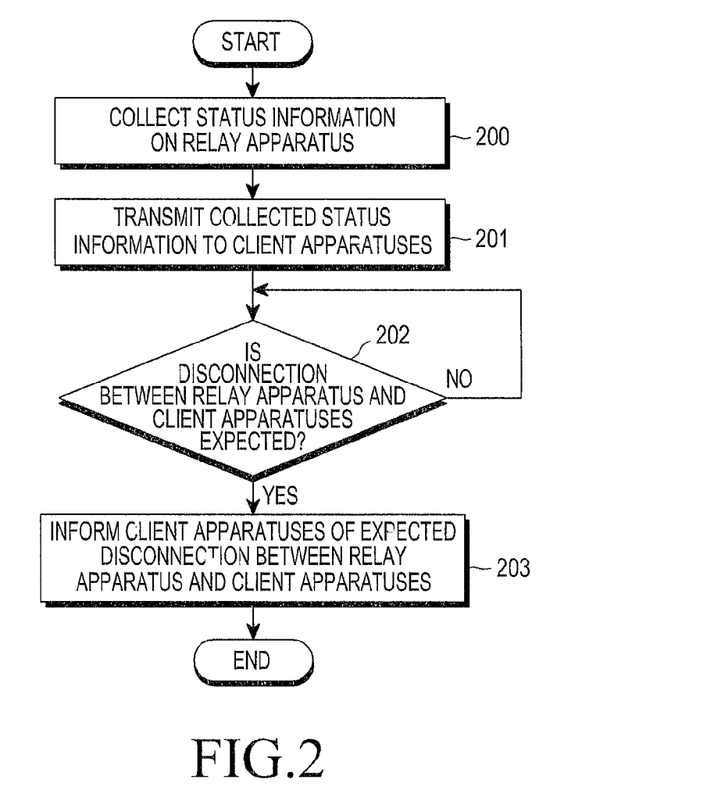
FIG. 2 illustrates a process in which an relay apparatus transmits status information of the relay apparatus to each client apparatus according to the embodiment of the present disclosure.

FIG. 2 illustrates a process in which an AP apparatus transmits status information of the AP apparatus to each client apparatus according to the embodiment of the present disclosure.

According to FIG. 2, the low power processor 100 collects status information on the relay apparatus in operation 200. Such status information may include an identifier, a movement distance, a movement displacement, a signal intensity, a type of a communication network, the number of connections, a remaining amount of battery power, a battery level, expected services (a printer, a monitor, DLNA, and the like), upper application information, and the like.

The low power processor 100 transmits collected status information to the client apparatuses in operation 201. At this point, the low power processor 100 can transmit status information by using a periodically broadcasted beacon frame and a probe response according to a probe request.

The low power processor 100 determines whether the disconnection between the relay apparatus and the client apparatuses is expected in operation 202. If the disconnection is expected, the process proceeds to operation 203, and if the disconnection is not expected, low power processor 100 continues to determine whether the disconnection is expected in operation 202.

The determination whether the disconnection between the relay apparatus and the client apparatuses are expected may be at least one of the operations of determining at least one of the movement distance and the movement displacement of the relay apparatus and determining whether the remaining amount of the battery of the relay apparatus is equal to or less than the threshold value.

The low power processor 100 can inform the client apparatuses of the expected disconnection between the relay apparatus and the client apparatuses in operation 203. In other words, in order to inform the client apparatuses of the expected disconnection of the relay apparatus and the client apparatuses, the low power processor 100 can generate a disconnection notification message including status information of the relay apparatus and transmit the disconnection notification message to the client apparatuses.

Figure 3A:
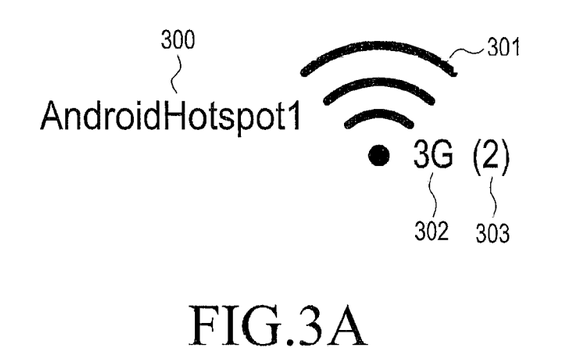
FIGS. 3A and 3B illustrate diagrams showing examples of displaying status information of the relay apparatus according to the embodiment of the present disclosure.
Figure 3B:
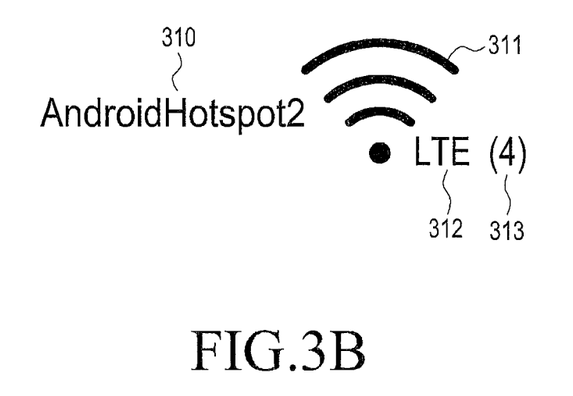

FIGS. 3A and 3B are diagrams illustrating examples of displaying status information of the relay apparatus according to the embodiment of the present disclosure.

According to FIG. 3A, the client apparatus that receives the status information of the relay apparatus can display an indication "AndroidHotspot1" 300 indicating SSID of the relay apparatus, an indicator 301 indicating a signal intensity, an indication "3G" 302 indicating a type of a communication network, and an indication "2" 303 indicating the number of connected client apparatuses, on the screen.

According to FIG. 3B, the client apparatus that receives the status information of the relay apparatus can display an indication "AndroidHotspot2" 310 indicating SSID of the relay apparatus, an indicator 311 indicating a signal intensity, an indication "LTE" 312 indicating a type of a communication network, and an indication "4" 313 indicating the number of connected client apparatuses on the screen.

When displaying such status information, the client apparatus may further display an indicator for indicating the remaining battery power of the relay apparatus.

Figure 4:
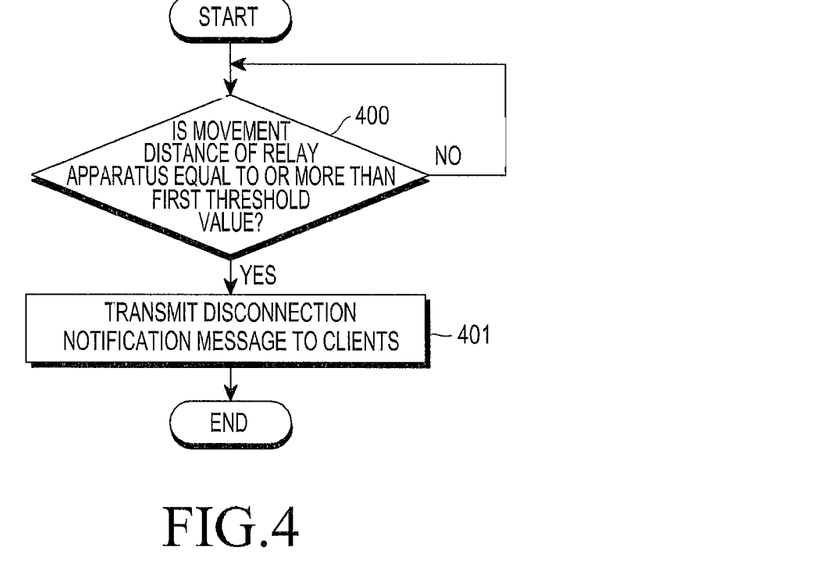
FIG. 4 illustrates a process of notifying each client apparatus of status information of a relay apparatus according to an embodiment of the present disclosure.

FIG. 4 illustrates a process of notifying the client apparatuses of expected disconnection between the relay apparatus and the client apparatuses according to an embodiment of the present disclosure.

According to an embodiment of the present disclosure in FIG. 4, the client apparatuses can be notified of the expected disconnection between the relay apparatus and the client apparatuses by using the movement distance of the relay apparatus.

According to FIG. 4, the low power processor 100 determines whether the movement distance of the relay apparatus sensed by the sensor 110 is equal to or more than the predetermined first threshold value in operation 400. If the movement distance of the relay apparatus is equal to or more than the first threshold value, the process proceeds to operation 401, or if the movement distance of the relay apparatus is less than the first threshold value, the low power processor 100 continues to determine whether the movement distance of the relay apparatus is equal to or more than the predetermined first threshold value in operation 400.

The low power processor 100 transmits the disconnection notification message including the status information of the relay apparatus to the client apparatuses in operation 401.

Such a disconnection notification message is to notify the client apparatuses of the expected disconnection between the relay apparatus and the client apparatuses, and the client apparatuses received the disconnection notification message can generate and display a notification screen indicating the status of the relay apparatus.

Figure 5:
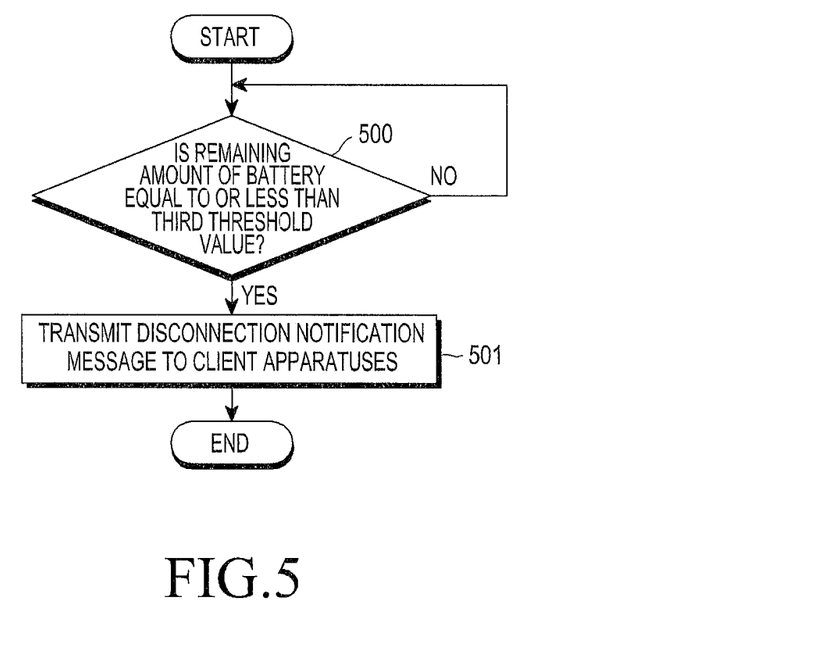
FIG. 5 illustrates a process of notifying each client apparatus of status information of a relay apparatus according to an embodiment of the present disclosure.

FIG. 5 illustrates a process of notifying the client apparatuses of the expected disconnection between the relay apparatus and the client apparatuses according to an embodiment of the present disclosure.

According to an embodiment of the present disclosure in FIG. 5, the client apparatuses can be notified of the expected disconnection between the relay apparatus and the client apparatuses by using the remaining amount of battery power of the relay apparatus.

According to FIG. 5, the low power processor 100 determines whether the remaining amount of battery power of the relay apparatus is equal to or less than the third threshold value in operation 500. If the remaining amount of battery power of the relay apparatus is equal to or less than the third threshold value, the process proceeds to operation 501, and if the remaining amount of battery power of the relay apparatus is more than the third threshold value, the low power processor 100 continues to determine whether the remaining amount of battery power of the relay apparatus is equal to or less than the third threshold value in operation 500.

The low power processor 100 transmits the disconnection notification message including the status information of the relay apparatus to the client apparatuses in operation 501.

The embodiments of the present disclosure have been described with examples of performing at least one of the operations of determining whether the movement distance of the relay apparatus is equal to or more than the first threshold value and determining whether the movement displacement of the relay apparatus is equal to or more than the second threshold value and performing an operation of determining whether the remaining amount of battery power of the relay apparatus is equal to or less than the third threshold value. According to another embodiment, the low power processor 100 can perform the determination described above by continuously monitoring at least one of the movement distance and the movement displacement of the relay apparatus or continuously monitoring the remaining amount of battery power of the relay apparatus and using the at least one of the movement distance and the movement displacement of the relay apparatus or the remaining amount of battery power of the relay apparatus.

In the embodiments of the present disclosure, operations for connecting a relay apparatus 11, the first client apparatus 20, and the second client apparatus 30 are connected to each other, and for determining a new relay apparatus are described with reference to FIGS. 6 and 7.

In an embodiment of the present disclosure, operations for determining the new relay apparatus by the relay apparatus 11 are described with reference to FIG. 6. In an embodiment of the present disclosure, operations for determining a new relay apparatuses by the client are described with reference to FIG. 7.

Figure 6:
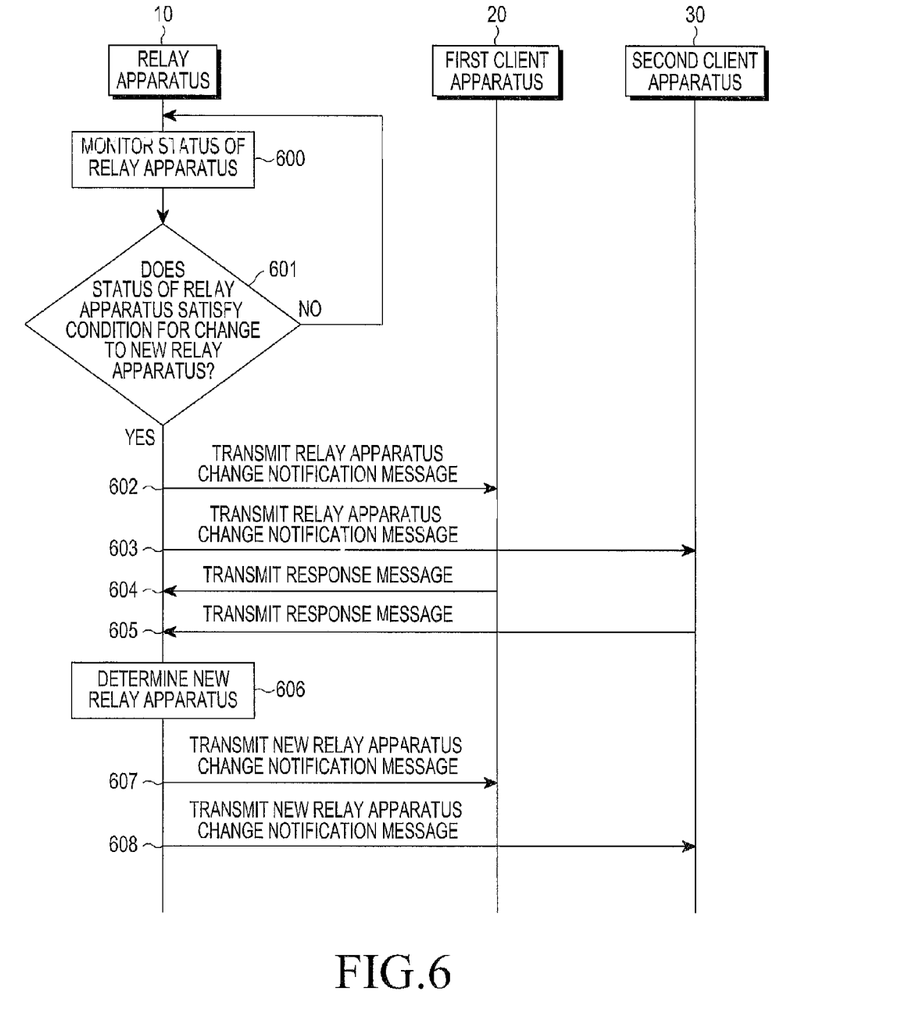
FIG. 6 illustrates a sequence diagram showing operations for determining a new relay apparatus according to an embodiment of the present disclosure.

FIG. 6 illustrates a sequence diagram showing operations for determining a new relay apparatus according to an embodiment of the present disclosure.

The relay apparatus 11 monitors the status of the relay apparatus 11 in operation 600. For example, the relay apparatus 11 can monitor at least one of the battery level of the relay apparatus 11 and the intensities of signals of the client apparatuses including the first client apparatus 20 and the second client apparatus 30. The relay apparatus 11 determines whether the status of the relay apparatus 11 satisfies the condition for a change to a new relay apparatus in operation 601. If the status of the relay apparatus 11 satisfies the condition for a change to a new relay apparatus, the process proceeds to operation 602, and if the status of the relay apparatus 11 does not satisfy the condition for a change to the a relay apparatus, the relay apparatus 11 continues to monitor the status of the relay apparatus 11 in operation 600.

In other words, the relay apparatus 11 determines at least one of the conditions in which the battery level of the relay apparatus is equal to or less than the fourth threshold value or the intensities of the received signals of the client apparatuses are equal to or less than the fifth threshold value. If at least one of the conditions in which the battery level of the relay apparatus is equal to or less than the fourth threshold value or the intensities of the received signals of the client apparatuses are equal to or less than the fifth threshold value is satisfied, the relay apparatus 11 can determine that the electronic apparatus can no longer operate as the relay apparatus.

In operations 602 and 603, the relay apparatus 11 can generate the relay apparatus change notification message for notifying that the relay apparatus 11 can no longer perform the relay function, and transmits the relay apparatus change notification message to a first client apparatus 20 and a second client apparatus 30. At this point, operations 602 and 603 can be performed at the same time or can be performed respectively. Further, the relay apparatus change notification message can include information on the client apparatuses together with the status information of the relay apparatus 11.

In operation 604, the first client apparatus 20 generates the response message including the client status information of the first client apparatus 20 and transmits the response message to the relay apparatus 11.

In operation 605, the second client apparatus 30 generates the response message including the client status information of the second client apparatus 30, and transmits the response message to the relay apparatus 11.

In operation 606, the relay apparatus 11 determines the new relay apparatus based on the received client status information.

The relay apparatus 11 can consider the client status information and determine a client apparatus that can be connected to the most client apparatuses as the new relay apparatus.

In operations 607 and 608, the relay apparatus 11 can generate the new relay apparatus notification message for notifying the change to the new relay apparatus, and transmit the generated new relay apparatus notification message to the first client apparatus 20 and the second client apparatus 30. Such a notification message can include information on the determined new relay apparatus. Further, the relay apparatus 11 can transmit the new relay apparatus notification message to the first client apparatus 20 and the second client apparatus 30 at the same time, or to the first client apparatus 20 and the second client apparatus 30, respectively.

Accordingly, even if the current relay apparatus is changed to a new relay apparatus, the client apparatuses can perform communication without disconnection by determining the new relay apparatus before the communication between the current relay apparatus and the client apparatuses ends and performing a communication between the determined new relay apparatus and the client apparatuses.

Figure 7:
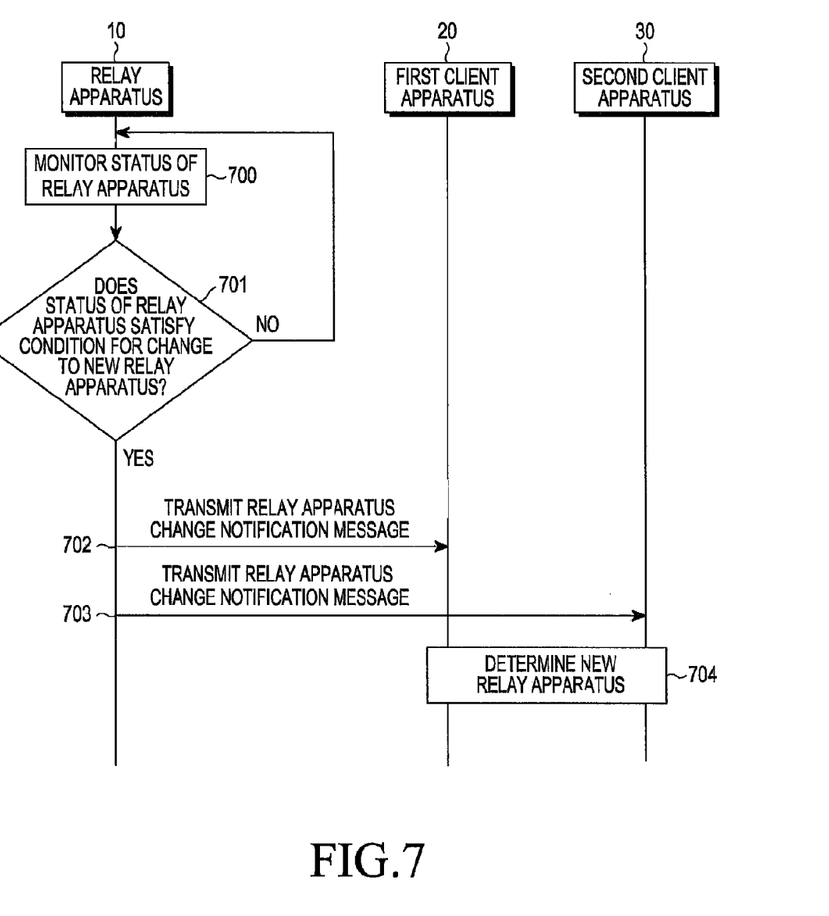
FIG. 7 illustrates a sequence diagram showing operations for determining a new relay apparatus according to an embodiment of the present disclosure.

FIG. 7 illustrates a sequence diagram showing operations for determining the new relay apparatus according to an embodiment of the present disclosure.

In operation 700, the relay apparatus 11 monitors the connection status of the relay apparatus 11. The relay apparatus 11 can monitor at least one of the battery level of the relay apparatus 11, and the intensities of the signals of the client apparatuses including the first client apparatus 20 and the second client apparatus 30. In operation 701, the relay apparatus 11 determines whether the status of the relay apparatus 11 satisfies the condition for a change to a new relay apparatus. If the status of the relay apparatus 11 satisfies the condition for a change to a new relay apparatus, the process proceeds to operation 702, and if the status of the relay apparatus 11 does not satisfies the condition for a change to a new relay apparatus, the process returns to operation 700 to continuously monitor the status of the relay apparatus 11.

In other words, the relay apparatus 11 determines at least one of the conditions in which the battery level of the relay apparatus is equal to or less than the fourth threshold value and the intensities of the received signals of the client apparatuses are equal to or less than the fifth threshold value. If at least one of the conditions in which the battery level of the relay apparatus is equal to or less than the fourth threshold value and the intensities of the received signals of the client apparatuses are equal to or less than the fifth threshold value is satisfied, the relay apparatus 11 can determine that the electronic apparatus can no longer operate as the relay apparatus.

In operations 702 and 703, the relay apparatus 11 can generate the relay apparatus change notification message for notifying that the relay apparatus 11 can no longer perform the relay function, and transmits the relay apparatus change notification message to the first client apparatus 20 and the second client apparatus 30. At this point, operations 702 and 703 can be performed at the same time or can be performed respectively. Further, the notification message can include status information of the relay apparatus 11 and information on the client apparatuses.

In operation 704, the first client apparatus 20 and the second client apparatus 30 determine the new relay apparatus based on the received relay apparatus change notification message.

The first client apparatus 20 and the second client apparatus 30 share client status information with each other, and can determine the new relay apparatus based on the shared client status information.

If the first client apparatus 20 can be connected to the most client apparatuses, the first client apparatus 20 determines itself as the new relay apparatus, generates a notification message for notifying the new relay apparatus is the first client apparatus 20 itself, and transmits the notification message to the second client apparatus 30. Thereafter, the first client apparatus 20 can operate as the relay apparatus and communicates with the second client apparatus 30.

According to the various embodiments of the present disclosure, the relay apparatus provides the status information of the relay apparatus itself to each client apparatus, monitors the connection status of the relay apparatus, determines a new relay apparatus if a condition for changing the relay apparatus is satisfied, selects the relay apparatus in a better communication environment, and notifies the user of the connection status of the currently connected relay apparatus. Therefore, it is advantageous in that the connection with the relay apparatus can be prevented from being suddenly disconnected.

It can be understood that the embodiments of the present disclosure can be implemented by hardware, software, or a combination of hardware and software. Any software can be stored, regardless of erasability or re-writability, a volatile or non-volatile storage device such as a ROM, a memory such as a RAM, a memory chip, a device or an integrated circuit, or an optically- or magnetically-recordable and machine-readable (for example, computer-readable) storage medium such as a CD, a DVD, a magnetic disc, or a magnetic tape. The method of determining the relay apparatus according to the present disclosure may be realized by a computer or a portable terminal including a controller and a storage unit (or a memory), the storage unit is an example of a machine-readable storage medium appropriate for storing a program or programs including instructions for realizing the embodiments of the present disclosure. Therefore, the present disclosure includes a machine-readable (for example, computer-readable and the like) storing program or programs including codes for realizing apparatuses or methods recited in any claims of the present specification. In addition, such programs can be electronically transferred through a certain medium such as a communication signal transmitted through a wire or wireless connection, and the present disclosure appropriately includes equivalents thereof.

Further, the electronic apparatus can receive and store the program from a program providing apparatus connected wirelessly or by wire. The program providing apparatus may include a program including instructions for enabling the electronic apparatus to perform a method of determining the a preset relay apparatus, a memory for storing information associated with determining a relay apparatus, a communication unit for performing a wire or wireless communication with the electronic apparatus, and a controller for transmitting a corresponding program to the electronic apparatus automatically or under the request of the electronic apparatus.

Although the present disclosure has been described with an example embodiment, various changes and modifications may be suggested to one skilled in the art. It is intended that the present disclosure encompass such changes and modifications as fall within the scope of the appended claims.

What is claimed is:

1. An electronic apparatus comprising:
   a communication unit configured to transmit and receive data; and
   a processor configured to:
   connect between the electronic apparatus operating as a relay apparatus and at least one client apparatus;
   if a disconnection between the electronic apparatus and the at least one client apparatus is expected, transmit, to the at least one client apparatus, a message including information indicating that the disconnection between the electronic apparatus and the at least one client apparatus is expected;
   receive at least one response message from the at least one client apparatus;
   determine one of the at least one client apparatus as a new relay apparatus based on the at least one response message;
   transmit information on the new relay apparatus to the at least one client apparatus; and
   disconnect between the electronic apparatus and the at least one client apparatus.

2. The electronic apparatus according to claim 1, wherein the processor is configured to determine whether the disconnection between the electronic apparatus and the at least one client apparatus is expected based on a status of the electronic apparatus.

3. The electronic apparatus according to claim 2, wherein the status of the electronic apparatus comprises at least one of an identifier, a movement distance, a movement displacement, a signal intensity, a type of communication network, a number of connections, a remaining amount of battery power, a battery level, expected services, or upper application information of the electronic apparatus.

4. The electronic apparatus according to claim 1, wherein the processor is configured to generate a disconnection notification message for notifying the at least one client apparatus of the expected disconnection and transmit the generated disconnection notification message to the at least one client apparatus.

5. The electronic apparatus according to claim 4, wherein the processor is configured to receive, from the at least one client apparatus, the at least one response message including a status of the at least one client apparatus, and select one of the at least one client apparatus as the new relay apparatus based on the status of the at least one client apparatus.

6. A method for determining a relay apparatus at an electronic apparatus, the method comprising:
   connecting between the electronic apparatus operating as a relay apparatus and at least one client apparatus;
   if a disconnection between the electronic apparatus and the at least one client apparatus is expected, transmitting, to the at least one client apparatus, a message including information indicating that the disconnection between the electronic apparatus and the at least one client apparatus is expected;
   determining one of the at least one client apparatus as a new relay apparatus;
   transmitting information on the new relay apparatus to the at least one client apparatus; and
   disconnecting between the electronic apparatus and the at least one client apparatus.

7. The method according to claim 6, further comprising:
   determining whether the disconnection between the electronic apparatus and the at least one client apparatus is expected based on a status of the electronic apparatus.

8. The method according to claim 7, wherein the status of the electronic apparatus comprises at least one of an identifier, a movement distance, a movement displacement, a signal intensity, a type of communication network, a number of connections, a remaining amount of battery power, a battery level, expected services, or upper application information of the electronic apparatus.

9. The method according to claim 6, wherein the informing the at least one client apparatus of the expected disconnection comprise generating a disconnection notification message for notifying the at least one client apparatus of the expected disconnection; and
   transmitting the generated disconnection notification message to the at least one client apparatus.

10. The method according to claim 9, further comprising:

receiving, from the at least one client apparatus, the at least one response message including a status of the at least one client apparatus, and wherein the determining one of the at least one client apparatus as the new relay apparatus comprises selecting one of the at least one client apparatus as the new relay apparatus.

11. An electronic apparatus comprising:
a communication unit configured to transmit and receive data; and
a processor configured to:
connect between a relay apparatus and at least one client apparatus including the electronic apparatus;
receive, from the relay apparatus, a message including information indicating that a disconnection between the relay apparatus and the electronic apparatus is expected;
determine one of the at least one client apparatus as a new relay apparatus based on the received information;
transmit information on the new relay apparatus to the at least one client apparatus; and
disconnect between the relay apparatus and the electronic apparatus.

12. The electronic apparatus according to claim 11, wherein the information includes a status of the relay apparatus and information on the at least one client apparatus.

13. The electronic apparatus according to claim 12, wherein the processor is configured to share a status of the at least one client apparatus with the at least one client apparatus based on the information on the at least one client apparatus, and select the one of the at least one client apparatus as the new relay apparatus based on the status of the at least one client apparatus.

14. The electronic apparatus according to claim 12, wherein the status of the at least one client apparatus comprises at least one of an identifier, a movement distance, a movement displacement, a signal intensity, a type of communication network, a number of connections, a remaining amount of battery power, a battery level, expected services, or upper application information of the at least one client apparatus.

15. A method for determining a relay apparatus at an electronic apparatus, the method comprising:
connecting between a relay apparatus and at least one client apparatus including the electronic apparatus;
receiving, from the relay apparatus, a message including information indicating that a disconnection between the relay apparatus and the electronic apparatus is expected;
determining one of the at least one client apparatus as a new relay apparatus based on the received information;
transmitting information on the new relay apparatus to the at least one client apparatus; and
disconnecting between the relay apparatus and the electronic apparatus.

16. The method according to claim 15, wherein the information includes a status of the relay apparatus and information on the at least one client apparatus.

17. The method according to claim 16, further comprising:
sharing a status of the at least one client apparatus with the at least one client apparatus based on the information on the at least one client apparatus, and
wherein the determining one of the at least one client apparatus as the new relay apparatus comprises selecting the one of the at least one client apparatus as the new relay apparatus based on the status of the at least one client apparatus.

18. The method according to claim 16, wherein the status of the at least one client apparatus comprises at least one of an identifier, a movement distance, a movement displacement, a signal intensity, a type of communication network, a number of connections, a remaining amount of battery power, a battery level, expected services, or upper application information of the at least one client apparatus.

19. A non-transitory computer readable recording medium in which instructions are stored and a program for executing operations is recorded, the operations comprising:
connecting between an electronic apparatus operating as a relay apparatus and at least one client apparatus;
if a disconnection between the electronic apparatus and the at least one client apparatus is expected, transmitting, to the at least one client apparatus, a message including information indicating that the disconnection between the electronic apparatus and the at least one client apparatus is expected;
determining one of the at least one client apparatus as a new relay apparatus;
transmitting information on the new relay apparatus to the at least one client apparatus; and
disconnecting between the electronic apparatus and the at least one client apparatus.

20. A non-transitory computer readable recording medium in which instructions are stored and a program for executing operations is recorded, the operations comprising:
connecting between a relay apparatus and at least one client apparatus including an electronic apparatus;
receiving, from the relay apparatus, a message including information indicating that a disconnection between the relay apparatus and the electronic apparatus is expected;
determining one of the at least one client apparatus as a new relay apparatus based on the received information;
transmitting information on the new relay apparatus to the at least one client apparatus; and
disconnecting between the electronic apparatus and the electronic apparatus.

* * * * *